Patented Dec. 19, 1922.

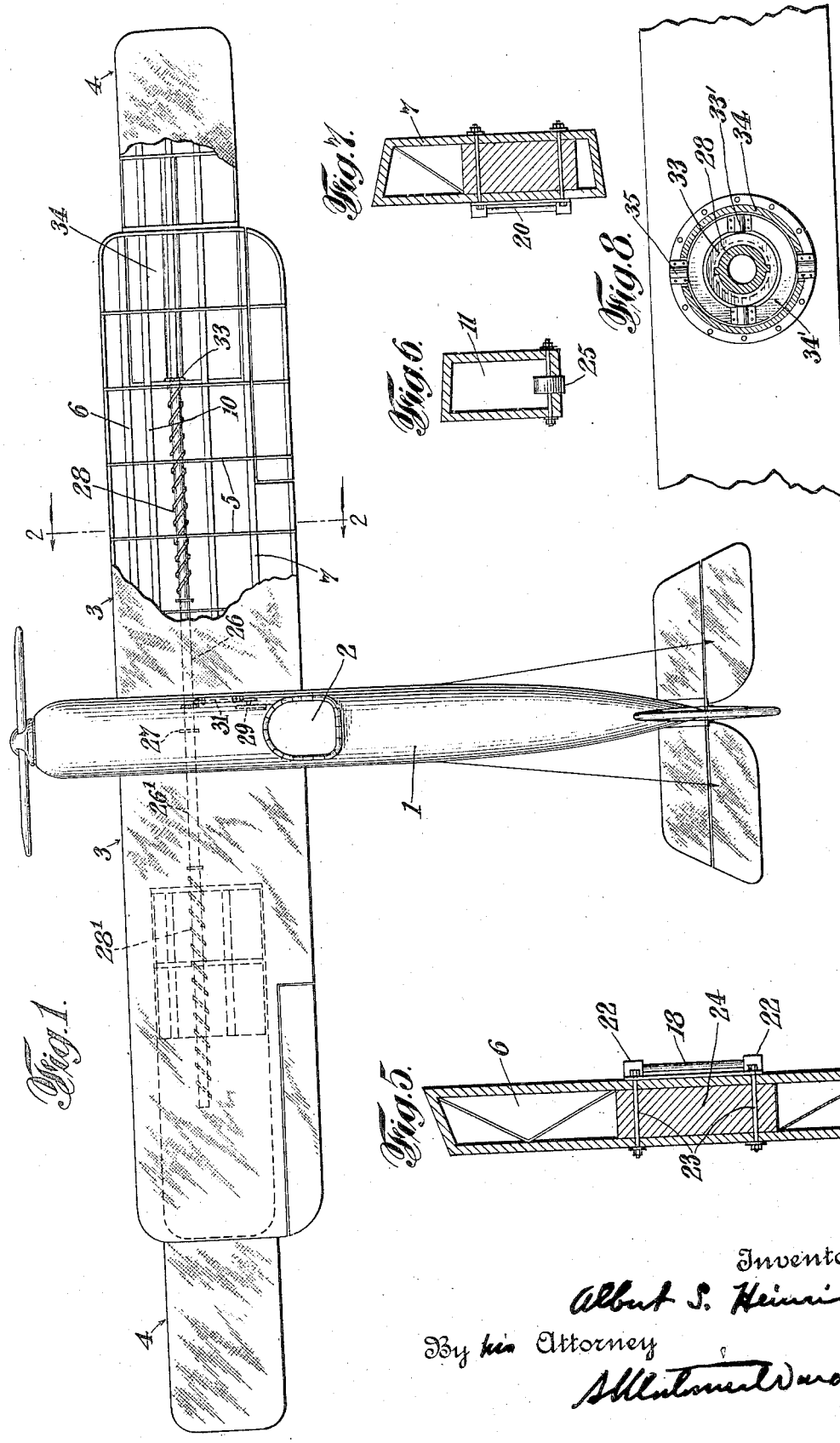

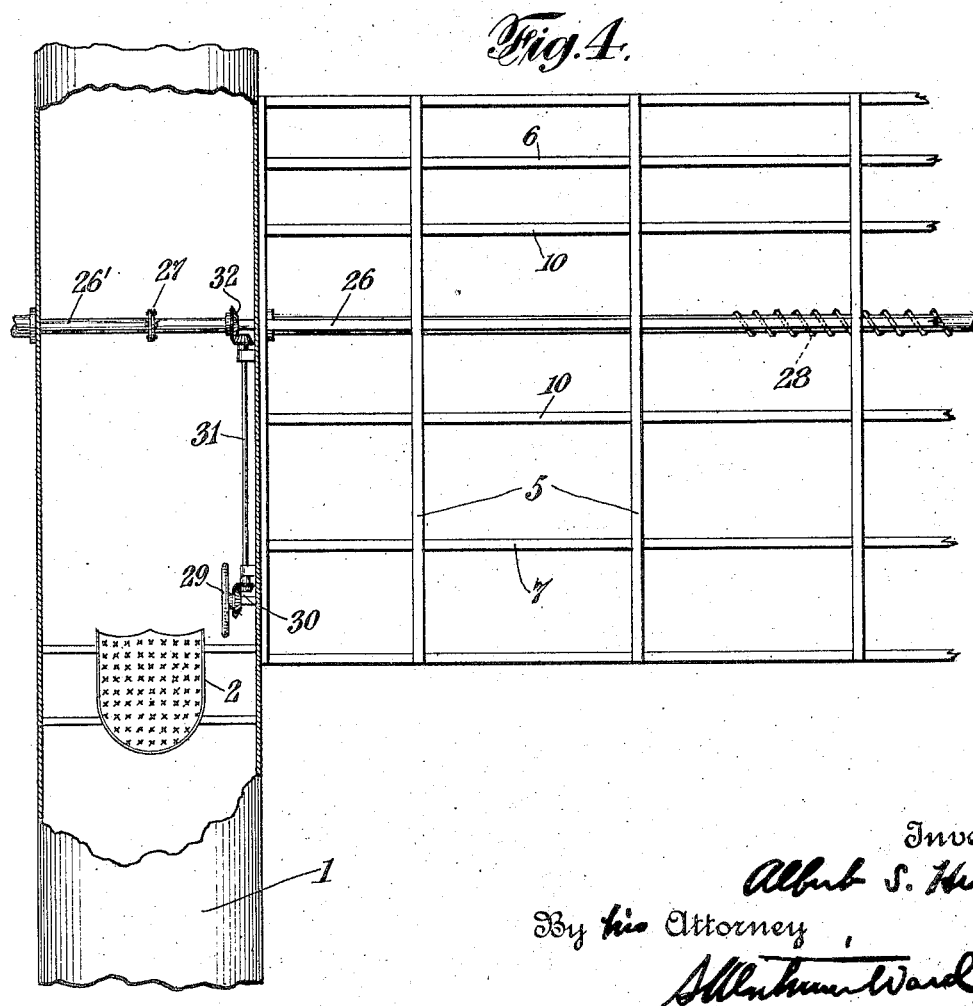

1,438,957

UNITED STATES PATENT OFFICE.

ALBERT S. HEINRICH, OF FREEPORT, NEW YORK.

AEROPLANE.

Application filed November 25, 1921. Serial No. 517,458.

*To all whom it may concern:*

Be it known that I, ALBERT S. HEINRICH, a citizen of the United States, and resident of Freeport, in the county of Nassau and State of New York, have invented certain new and useful Improvements in Aeroplanes, of which the following is a specification.

The invention relates to aeroplanes and more particularly to means for varying the effective span of the aeroplane wings or sustaining members. By the invention means are provided whereby an increased span and effective surface of wing area may be provided when desired, the span and effective area of wing surface also being decreased at will.

In the preferred form of my invention the desired result is accomplished by the provision of sliding auxiliary wing sections which are carried by the main wing elements or sustaining members and are operated by positive means under the control of the aviator to move the same inwardly or outwardly. In the preferred construction also means are provided for suitably guiding the auxiliary wing sections in their inward and outward movement, for taking up the thrust to which the same will be subjected in operation, and preventing jamming of the same in their guideways.

It is desirable to have an increased wing span under various conditions such as when the machine is rising from the ground, when it is climbing, when it is operating at high altitudes, when carrying heavy loads, and when it is about to make a landing. At other times, such as when high speed is desired, an increased wing span is a disadvantage since it tends to decrease the speed of the machine. With the present invention the movable wing sections may be moved positively and with precision so as to reliably and safely adjust the wing span to suit conditions in a simple and effective manner, under the instant control of the operator in the cockpit of the machine.

An additional field of usefulness of the invention may be noted in the case of a military aeroplane intended for carrying bombs, the increased wing span being utilized until the bombs have been dropped after which the auxiliary wing sections may be drawn inwardly and the return trip made at high speed.

The objects of the invention accordingly are the provision of an improved construction of the character referred to together with improved combinations of parts and construction of elements which may be utilized in the same, all as will more fully appear in the following specification and be particularly pointed out in the appended claims.

In order that the invention may be clearly understood attention is hereby directed to the accompanying drawings forming part of this application and illustrating, by way of example, one embodiment of the invention. In the drawings—

Fig. 1 represents a top plan view of an aeroplane equipped with one embodiment of the invention, certain parts being shown in section and broken away;

Fig. 2 is a vertical section taken on line 2—2 of Fig. 1 with the auxiliary wing section considered as having been drawn into its inner position;

Fig. 3 is a vertical section taken on line 3—3 of Fig. 2;

Fig. 4 is an enlarged view of a portion of the fuselage and an adjacent wing structure shown partly in plan view and partly in horizontal section;

Figs. 5, 6 and 7 are respectively enlarged sectional views of a forward wing beam, an upper wing beam and a rear wing beam, all of the same being provided with anti-friction guiding means for an auxiliary wing section, and Fig. 8 is an enlargement of a detail.

Referring to the drawings, I have illustrated an aeroplane having a fuselage 1 provided with the cockpit 2 for the aviator and the main wings, or sustaining structures 3, 3. The machine may, of course, be provided with the usual controlling, steering, propelling and balancing elements, which need not be described.

The auxiliary wing sections 4, 4, are slidably mounted on the main wings 3, 3, so as to be extensible beyond the same to increase the span and to be operable to draw the same inwardly, or towards the fuselage.

The main wings are provided with a plurality of transverse braces 5 and of longitudinal beams including the front main wing beam 6 and the rear main wing beam 7. Each one of the transverse struts or braces 5 may be made up of the upper and lower cap strips 8 and 9 together with suitable web members.

In addition to the main forward and rear longitudinal beams 6 and 7 each main wing member may be provided with upper longitudinal beams 10, 10, and 11 and bottom longitudinal beams $10^1$, $10^1$ and $11^1$. Each transverse brace or frame member may contain a front web member 12, upper web members 13, secured to the upper cap strip 8 and positioned between the longitudinal beams 6 and 10, 10 and 11, 11 and 10, and 10 and 7, the lower intermediate web members $13^1$ secured to the lower cap strip 9 and positioned between the beams 6 and $10^1$, $10^1$ and $11^1$, $11^1$ and $10^1$, and $10^1$ and 7, a trailing edge web section 14 being positioned between the upper and lower cap strips to the rear of beam 7.

Each auxiliary wing section 4 comprises longitudinal beams 15 and $15^1$ which are adapted to be aligned with the upper and lower beams 10 and $10^1$ of the main wing member. The auxiliary wing member is also provided with upper and lower cap strips such as the one indicated at 16, and suitable webs 17.

The forward and rear beams 6 and 7 of the main wing structure are preferably of box girder form, as is indicated in Figs. 5 and 7. Beam 6 carries a vertical roller 18 which is adapted to be slidingly engaged by the forward edge of the auxiliary wing member, this auxiliary wing member having a bearing plate indicated at 19 at its forward edge, adapted to bear against roller 18. Beam 7 is similarly provided with a roller 20 against which the rear edge of the auxiliary wing may slidingly engage, this rear or trailing edge of the auxiliary wing similarly being provided with a bearing plate 21. Roller 18 may be mounted in bearings indicated at 22 at the ends of bolts 23 which extend through beam 6, a block of wood, or the like, 24 preferably being interposed btween the sides of the box girder to back up the roller 18. The roller 20 is similarly carried and backed by the beam 7.

The upper surface of the auxiliary wing 4 slides in contact with rollers 25, which may be rotatably mounted at the lower edges of beams 10 and 11, as indicated in Fig. 6. Similarly the lower surface of the auxiliary wing may be slidably mounted on similar rollers which are rotatably mounted adjacent the upper surfaces of the lower beams $10^1$ and $11^1$, beams 10, 11, $10^1$ and $11^1$ preferably being of box section, as indicated in Fig. 6.

Means are illustrated whereby the auxiliary wing sections are positively moved in and out and positively held in adjusted position. As shown in the drawings a shaft 26 extends longitudinally of one main wing section and is positively connected, as by the flange coupling 27, to a similar shaft $26^1$ extending in alignment therewith longitudinally of the other main wing section. Shaft 26 is provided with an external screw-thread or worm 28 and shaft $26^1$ is provided with a similar screw-thread or worm $28^1$ one of these screw-threads being right handed and the other left handed. A hand wheel 29 adjacent to the operator's seat in the cockpit is connected by beveled gears 30, shaft 31 and beveled gears 32 to shaft 26, while the screw-threaded portions 28 and $28^1$ of shafts 26, $26^1$ extend through nuts 33 secured to the inner edges of the auxiliary wing sections. Guiding tubes 34 are preferably carried by the auxiliary wing sections, the screw-threaded portions of shafts 26, $26^1$ extending into the same. Nuts 33 are preferably mounted on universal joints which may be secured at the inner edges of the auxiliary wings so as to take care of any faulty alignment of the parts in operation. The nut 33 is preferably positioned as shown in Fig. 1 upon the inner end of the guide tube 34 upon which it is mounted by the said universal joint as shown in Fig. 8. In this figure the nut is shown mounted on the inner end of the said tube 34 by a conventional form of universal joint consisting of trunnions 33' swiveled on a ring 34' to which the trunnions are secured by the clamps (which in the drawings have been removed) and this ring in turn is provided with trunnions 35 secured by clamps (which in the drawings have been removed) to the inner flanged end of the guide tube 34. Shafts 26, $26^1$ are rotatably mounted in suitable bearings carried by the transverse frame members or braces 5.

With the construction described it is obvious that rotation of hand wheel 29 in one direction or the other will cause the simultaneous movement of the wing sections inwardly or outwardly, these wing sections each necessarily moving through the same distance as the other as they slide outwardly or inwardly. It will also be noted that the guiding means described will cause the auxiliary wings to slide freely without binding. There is, of course, considerable thrust against the wings while the machine is in operation which would tend to bind the auxiliary wing members in their guideways, this thrust being, however, entirely taken up by the various rollers and substantial frame members which have been described.

It is, of course, obvious that the invention is equally applicable to monoplanes and biplanes.

It should be understood that the invention is not limited strictly to the details of construction described but is as broad as is indicated by the accompanying claims.

What I claim is:—

1. In an aeroplane, the combination of a body, wings extending laterally therefrom and of stream line formation and having forward and rear beams extending longitudinally thereof and spaced inwardly from the forward and trailing edges of the wings, said wings having interior spaces extending longitudinally thereof and confined between said beams, auxiliary wing sections slidably carried within said spaces in said wings and adapted to extend laterally beyond said wings, said sections being of stream line form and slidable within said spaces and guided by said beams, positive operative connections between said auxiliary wing sections for positively moving both sections equally in and out when operated, and driving means operatively related to said connections for actuating same to move the sections in and out.

2. In an aeroplane, the combination of a body, wings extending laterally therefrom and of stream line formation and having forward and rear beams extending longitudinally thereof and spaced inwardly from the forward and trailing edges of the wings, said wings having interior spaces extending longitudinally thereof and confined between said beams, auxiliary wing sections slidably carried within said spaces in said wings and adapted to extend laterally beyond said wings, said sections being of stream line form and slidable within said spaces, positive operative connections between said auxiliary wing sections for positively moving both sections equally in and out when operated, said connections comprising nuts at the inner portions of the auxiliary sections and screw threads extending through the nuts and telescoping with the auxiliary sections, and means for operating said connections to move the auxiliary sections.

3. In an aeroplane, the combination of a body, wings extending laterally therefrom and of stream line formation and having forward and rear beams extending longitudinally thereof and spaced inwardly from the forward and trailing edges of the wings, said wings having interior spaces extending longitudinally thereof and confined between said beams, auxiliary wing sections slidably carried within said spaces in said wings and adapted to extend laterally beyond said wings, said sections being of stream line form and slidable within said spaces, positive operative connections between said auxiliary wing sections for positively moving both sections equally in and out when operated, said connections comprising nuts mounted on universal joints at the inner portions of the sections and screw threads extending through the nuts and into the auxiliary sections, and means for operating said connections to move the auxiliary sections.

4. In an aeroplane the combination of a fuselage, wings extending laterally therefrom, said wings being of stream line formation and having interior spaces extending longitudinally thereof, the forward and rear ends of said spaces being spaced inwardly from the forward and trailing edges of the wings, said wings also having forward and rear beams extending longitudinally thereof, at the ends of said spaces, auxiliary wing sections slidably carried within said spaces in said wings, and adapted to extend laterally beyond the same, said sections being of stream line formation and slidably fitting within said spaces, and guided by said forward and rear beams, hand operated means adjacent to the aviator's seat, and positive connections between said means and auxiliary wing sections for moving said members equal distances outwardly or inwardly and for holding the same in adjusted positions against outward or inward movement.

5. In an aeroplane, the combination of a fuselage, wings extending laterally therefrom, auxiliary wing sections slidably carried by said wings and adapted to extend laterally beyond the same, control means for controlling said auxiliary wing sections, nuts carried by said auxiliary wing sections, right and left handed screws carried by said wings and extending through the nuts carried by the said sections on opposite sides of the fuselage, and means for rotating said screws equally under control of said control means.

6. In an aeroplane, the combination of a fuselage, wings extending laterally therefrom, said wings having forward and rear beams extending longitudinally thereof spaced inwardly from the forward and trailing edges of the wings, and upper and lower beams intermediate said forward and rear beams, auxiliary wing sections slidably mounted between said upper and lower beams and with their forward and rear edges abutting said forward and rear beams, anti-friction means interposed between said beams and auxiliary sections, and means for positively moving said auxiliary sections towards and away from the fuselage.

7. In an aeroplane, the combination of a fuselage, wings extending laterally therefrom, said wings having forward and rear beams extending longitudinally thereof spaced inwardly from the forward and trailing edges of the wings, and upper and lower beams intermediate said forward and rear beams, auxiliary wing sections slidably mounted between said upper and lower beams and with their forward and rear edges abutting said forward and rear beams, anti-friction rollers carried by said forward and rear beams, slidably engaged by the forward and rear edges of said auxiliary sections, rollers carried by said upper and lower beams, slidably engaged by the upper and lower surfaces of said auxiliary sections, said auxiliary sections having longitudinal beams aligned with said upper and lower main wing beams, and means for moving said auxiliary sections towards and away from the fuselage.

In testimony whereof, I have signed my name to this specification.

ALBERT S. HEINRICH.